US012746650B2

(12) United States Patent
Fieldbinder et al.

(10) Patent No.: US 12,746,650 B2
(45) Date of Patent: Sep. 29, 2026

(54) BOLT TENSIONING TOOL

(71) Applicant: MILWAUKEE ELECTRIC TOOL CORPORATION, Brookfield, WI (US)

(72) Inventors: Douglas R Fieldbinder, Greendale, WI (US); Maxwell L. Merget, Whitefish Bay, WI (US); Jacob P. Schneider, Cedarburg, WI (US); Mitchell A. Gibson, New Berlin, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 475 days.

(21) Appl. No.: 18/462,882

(22) Filed: Sep. 7, 2023

(65) Prior Publication Data

US 2024/0083001 A1 Mar. 14, 2024

Related U.S. Application Data

(60) Provisional application No. 63/405,084, filed on Sep. 9, 2022.

(51) Int. Cl.
*B25B 29/02* (2006.01)
*B25B 23/142* (2006.01)

(52) U.S. Cl.
CPC .......... *B25B 29/02* (2013.01); *B25B 23/1425* (2013.01)

(58) Field of Classification Search
CPC ......... G01L 5/246; B25B 29/02; B25B 21/02; B25B 21/002; B25B 23/1425; B23P 19/06
See application file for complete search history.

(56) References Cited

U.S. PATENT DOCUMENTS

| | | | | | |
|---|---|---|---|---|---|
| 3,969,960 | A * | 7/1976 | Pagano | B25B 23/1425 | 73/761 |
| 4,016,938 | A * | 4/1977 | Rice | B25B 23/1456 | 73/761 |
| 4,294,122 | A * | 10/1981 | Couchman | G01N 29/24 | 73/761 |

(Continued)

FOREIGN PATENT DOCUMENTS

GB 1532910 A * 11/1978 ......... B25B 23/1456

OTHER PUBLICATIONS

Elcometer, "Bolt Tension Monitors," Catalog © 2011 (4 pages).
HTL Group, "Excellence in Controlled Bolting Solutions," Catalog dated Nov. 30, 2017 (56 pages).

*Primary Examiner* — David B. Thomas
(74) *Attorney, Agent, or Firm* — Michael Best & Friedrich LLP

(57) ABSTRACT

A bolt tensioning tool includes a housing, an electric motor positioned within the housing, a tensioning assembly connectable to a bolt for applying tension thereto, and a bolt tension monitoring system. The bolt has a threaded portion and a surface. The bolt tension monitoring system includes a transmitter, a receiver, a sensor housing, and a controller. The sensor housing has an inner wall defining a recess that receives the surface of the bolt. The controller determines a dimension of the bold during a tensioning operation and determines the tension in the bolt based on the dimension. The bolt tension monitoring system monitors the tension of the bolt during a tensioning operation. The tension assembly applies tension to the bolt during the tensioning operation.

17 Claims, 10 Drawing Sheets

(56) References Cited

U.S. PATENT DOCUMENTS

| | | | | | |
|---|---|---|---|---|---|
| 4,899,591 | A * | 2/1990 | Kibblewhite | B25B 23/1425 | 73/761 |
| 5,150,620 | A * | 9/1992 | Allison | G01L 5/246 | 73/761 |
| 5,237,516 | A * | 8/1993 | Heyman | G01L 1/255 | 73/761 |
| 5,257,207 | A * | 10/1993 | Warren | B25B 23/14 | 702/43 |
| 5,412,582 | A * | 5/1995 | Hesthamar | F16B 31/028 | 702/43 |
| 6,925,395 | B2 * | 8/2005 | Kadner | B25B 23/1425 | 702/41 |
| 7,360,435 | B2 * | 4/2008 | Nassar | G01L 5/246 | 73/761 |
| 8,596,134 | B2 * | 12/2013 | Mekid | F16B 31/02 | 73/761 |
| 9,632,016 | B2 * | 4/2017 | Hernandez | G01N 3/22 | |
| 10,131,042 | B2 * | 11/2018 | Mergener | B25B 21/02 | |
| 10,131,043 | B2 * | 11/2018 | Mergener | B23B 45/008 | |
| 10,213,908 | B2 * | 2/2019 | Mergener | B25F 5/00 | |
| 10,325,362 | B2 * | 6/2019 | Sakakibara | G01B 9/02 | |
| 10,967,489 | B2 * | 4/2021 | Mergener | B25B 23/1475 | |
| 11,371,300 | B2 * | 6/2022 | Skaarsjoe | B25B 21/002 | |
| 11,465,263 | B2 * | 10/2022 | Woetzl | B25B 23/1475 | |
| 11,931,872 | B2 * | 3/2024 | Asplund | B25B 23/1425 | |
| 12,017,332 | B2 * | 6/2024 | Abbott | B25B 29/02 | |
| 2007/0140812 | A1 * | 6/2007 | Ohtake | B25B 21/002 | 411/403 |
| 2021/0355766 | A1 * | 11/2021 | Skaarsjoe | G01L 5/24 | |
| 2021/0379744 | A1 * | 12/2021 | Seith | B25B 21/026 | |
| 2022/0126421 | A1 * | 4/2022 | Graulich | B23Q 3/06 | |
| 2022/0299946 | A1 * | 9/2022 | Abbott | B25B 21/00 | |

* cited by examiner

BOLT TENSIONING TOOL

CROSS-REFERENCE TO RELATED APPLICATION

This application claims priority to U.S. Provisional Patent Application No. 63/405,084, filed on Sep. 9, 2022, the entire contents of which are incorporated herein by reference.

FIELD OF THE INVENTION

The present disclosure relates generally to a device for tensioning bolts.

BACKGROUND

In certain applications, such as bolting applications, it is often desirable to achieve a given tension to create a fastened joint. One approach to accomplishing this is to preload bolts using bolt tensioning tools, which are most commonly powered by pressurized hydraulic fluid, and require a pump and motor assembly to supply the tool with pressurized hydraulic fluid.

SUMMARY

The present disclosure provides, in one aspect, a bolt tensioning tool including a housing, an electric motor positioned within the housing, a tensioning assembly connectable to a bolt for applying tension thereto, and a bolt tension monitoring system. The bolt has a threaded portion and a surface. The bolt tension monitoring system includes a transmitter configured to transmit a signal, a receiver configured to receive the signal, a sensor housing, and a controller. The sensor housing has an inner wall defining a recess configured to receive the surface of the bolt. The controller is configured to determine a dimension of the bold during a tensioning operation and determine the tension in the bolt based on the dimension. The bolt tension monitoring system configured to monitor the tension of the bolt during a tensioning operation. The tension assembly applies tension to the bolt during the tensioning operation.

The present disclosure provides, in yet another aspect, a bolt tensioning tool including a housing, an electric motor positioned within the housing, and a tensioning assembly having an inner socket and an outer socket. The inner socket is connectable to a bolt, and the outer socket is connectable to a nut. The outer socket is configured to rotate the nut relative to the bolt to apply tension to the bolt during a tensioning operation. A bolt tension monitoring system is positioned within the housing and includes an ultrasonic transducer and an ultrasonic sensor. The bolt tension monitoring system is configured to monitor the tension of the bolt during the tensioning operation.

The present disclosure provides, in yet another aspect, a bolt tensioning tool including a housing, an electric motor positioned within the housing, and a tensioning assembly having an inner socket and an outer socket. The inner socket is connectable to a bolt, the outer socket connectable to a nut, and the outer socket is configured to rotate the nut relative to the bolt to apply tension to the bolt during a tensioning operation. A bolt tension monitoring system is configured to monitor the tension of the bolt during the tensioning operation. The bolt tension monitoring system include a controller and a sensor. The controller is configured to determine the tension of the bolt based on a signal from the sensor corresponding with a dimension of the bolt.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
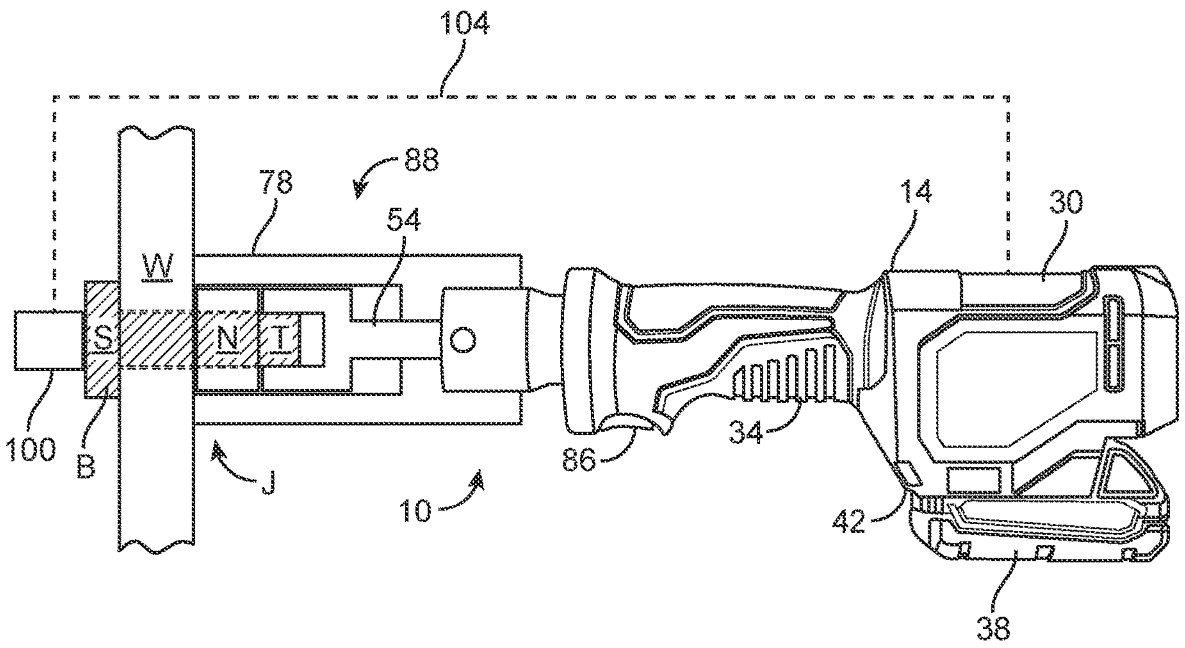
FIG. 1 is a side view of a bolt tensioning tool and a bolt monitoring tool in accordance with an embodiment of the disclosure.
Figure 2:
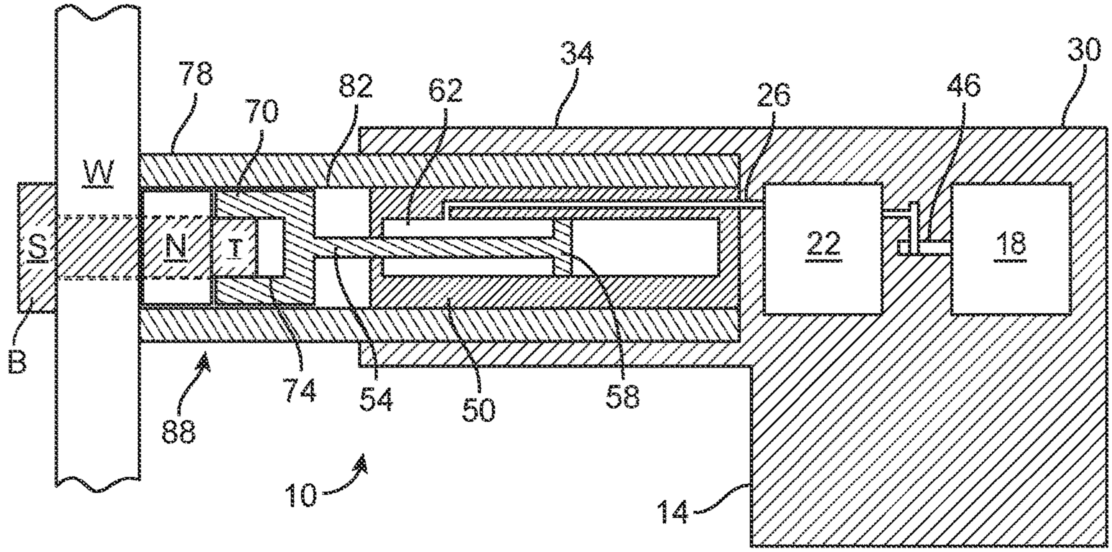
FIG. 2 is a schematic side view of the bolt tensioning tool of FIG. 1.

With reference to FIGS. 1 and 2, a bolt tensioning tool 10 is operable to apply a tensile force to a bolt B fastened to a workpiece W by a threaded nut N, prior to torque being applied to the nut N to create a fastened joint J. The bolt B includes a surface S and a threaded portion T. Although the workpiece W is schematically illustrated as a single body, the workpiece W may include two or more bodies or objects that are connected by the joint J.

With reference to FIG. 2, the illustrated tool 10 includes a housing 14, an electric motor 18 positioned within the housing 14, and bolt tensioning assembly 88. The bolt tensioning assembly 88 includes a hydraulic pump 22, a piston 54, and a collar 78. The bolt tensioning assembly 88 is operable to apply tension to the bolt B during a bolt tensioning operation. The bolt tensioning operation includes a plurality of impact events that apply tension to the bolt B.

In the illustrated embodiment of the tool 10, the housing 14 includes a motor housing portion 30, in which the motor 18 is positioned, and a handle portion 34 extending from the motor housing portion 30 (e.g., in a direction coaxial with a drive axis of the motor 18 in some embodiments). The motor housing portion 30 defines a first end of the housing. The handle portion 34 is positioned between the motor housing portion 30 and a second end of the housing 14. The handle portion 34 may be grasped by a user when the tool 10 is in use. Alternatively, the handle portion 34 and the motor housing portion 30 may be offset from each other, or disposed at a non-zero angle (i.e., non-coaxial) relative to each other.

The hydraulic pump 22 is positioned within the housing 14 and is driven by the motor 18 to pressurize hydraulic fluid stored within the housing 14 (for example, in an onboard reservoir, not shown). The hydraulic pump 22 is positioned between the motor 30 and the handle portion 34. The hydraulic pump 22 may also be positioned in the motor housing portion 30.

With reference to FIGS. 1 and 2, the tool 10 also includes a cylinder 50 at least partially located within the housing 14 (in particular, the handle portion 34 of the housing 14). The piston 54 is disposed within the cylinder 50. The piston 54 includes a head portion 58 at a rear end thereof (i.e., at the right end of the piston 54 from the frame of reference of FIG. 2) that is in sliding contact with the cylinder 50. As such, an annular chamber 62 is defined between the cylinder 50 and the piston 54 into which pressurized hydraulic fluid is transferred by the pump 22 (via a passageway 26 fluidly communicating the pump 22 and the cylinder 50). Although not shown, a biasing element (e.g., a compression spring) may bias the piston 54 toward an initial extended position relative to the cylinder 50, with the spring being compressed in response to retraction of the piston 54 within the cylinder 50 during the bolt tensioning operation. And, the tool 10 may also include a sensor for detecting the pressure of the hydraulic fluid within the chamber 62 and a valve (not shown) selectively fluidly communicating the cylinder and the onboard reservoir to return the pressurized hydraulic fluid to the reservoir in response to the detected pressure of the hydraulic fluid within the chamber 62 exceeding a predetermined or user-set threshold, allowing the compression spring to rebound and return the piston 54 to its initial extended position.

The piston 54 also includes a mount 70 at a front end thereof that is connectable to the threaded portion T of the bolt B when the tool 10 is in use. In the illustrated embodiment of the tool 10, the mount 70 includes a threaded inner periphery 74 having a nominal diameter and thread pitch as the threaded portion T. As such, to connect the piston 54 and the bolt B, the piston mount 70 needs only to be threaded to the threaded portion T of the bolt B. Alternatively, the mount 70 may include jaws or an adapter capable of grasping or otherwise temporarily connecting the piston 54 to the threaded portion T during a bolt tensioning operation. In an exemplary embodiment, the mount 70 may be formed as a threaded collet (not shown). The threaded collet may cooperate with an outer sleeve to cinch the collet flanges around the threaded portion T of the bolt B. Further embodiments of the mount 70 are discussed in more detail below.

The collar 78 extends between the housing 14 (in particular, the handle portion 34 of the housing 14) and the workpiece W. In some embodiments of the tool 10 (FIG. 1), the collar 78 may be separate from the housing 14, requiring a user to install the collar 78 between the housing 14 and the workpiece W during each bolt tensioning operation. In other embodiments (FIG. 2), the collar 78 is integrated with the housing 14 and non-separable from the housing 14. In other embodiments the collar 78 may be formed from multiple pieces to allow for a system of exchangeable anvils corresponding to different sized nuts and different applications. In yet other embodiments, the collar 78 may be integrated with the cylinder 50 and non-separable from the cylinder 50. The collar 78 includes a bore 82 coaxial with the piston 54 in which the piston mount 70 is slidable.

As shown in FIG. 1, the tool 10 includes a battery pack 38 removably coupled to a battery receptacle 42 located at the bottom of the motor housing portion 30. The electric motor 18 receives power from the battery pack 38 via the battery receptacle 42 when the battery pack 38 is coupled to the battery receptacle 42. In the illustrated embodiment, the motor 18 is a brushless direct current ("BLDC") motor with a stator and a rotor (not shown) having a motor output shaft 46 that is rotatable about an axis relative to the stator. In other embodiments, other types of motors may be used.

Prior to a bolt tensioning operation, the collar 78 is positioned between the housing 14 and workpiece W, and then the piston mount 70 is connected to the threaded portion T. To initiate a bolt tensioning operation, a user may depress a trigger 86 located on the handle portion 34 of the housing 14 (FIG. 1), which activates the motor 18. The motor 18 outputs torque via the motor output shaft 46 to the pump 22, thus driving the pump 22 to draw hydraulic fluid from the onboard reservoir and transfer the pressurized hydraulic fluid into the annular chamber 62, thus causing the piston 54 to translate within the cylinder 50 in a rearward direction (i.e., toward the right from the frame of reference of FIG. 2). As the piston 54 translates, a tensile force is applied to the threaded portion T and an equal and opposite reaction force is applied by the collar 78 to the housing 14 to maintain the housing 14 at a fixed distance relative to the workpiece W. As the tensile force increases, the bolt B is stretched, opening a gap between the workpiece W and the nut N. As used herein, the housing 14 may be configured as an outer housing clamshell enclosing, or substantially enclosing, the motor 18, pump 22, and cylinder 50. However, in some embodiments, the housing 14 may include and/or be configured as an internal housing or case made from a material strong enough to absorb the reaction force applied to the collar 78.

In some embodiments, the tool 10 includes a user interface (not shown) that allows a user to preset the tension to be applied to a bolt and displays the tension applied to the bolt in real time during a tensioning operation. The user interface, which may be configured as or alternatively include a display, may be integrated into the housing. Alternatively, in some embodiments, the tool 10 is remotely configurable using a mobile electronic device (e.g., a mobile phone or portable computer). In some embodiments of the tool 10, the user interface may also or alternatively include a series of colored LEDs to indicate different conditions of the tool 10.

In some embodiments, the piston 54 and the collar 78, amongst other components, collectively define a tensioning assembly 88 connectable to the bolt B for applying tension thereto. Although not shown in FIG. 1 or 2, the collar 78 includes a lateral opening into the interior of the bore 82, permitting the user to access the nut N (e.g., with a wrench). After the bolt B is stretched a sufficient amount, the motor 18 is deactivated, stopping translation of the piston 54. The motor 18 may be deactivated completely or, more commonly, may be braked or the speed or power reduced, stopping significant translation of the piston 54 but preserving the target pressure and thereby the desired tension. The user may then tighten the nut N to the workpiece W, thereby closing the gap. Thereafter, the pressurized hydraulic fluid may be exhausted from the annular chamber 62 back to the onboard reservoir, permitting the piston 54 to return to its initial extended position. As this occurs, the tensile force on the bolt B is released, permitting the bolt B to rebound to a partially stretched shape. The piston mount 70 is then detached from the threaded portion T, and the tool 10 and the collar 78 are removed from the fastened joint J. Because the bolt B is elastically deformed during a bolt tensioning operation, a clamping force is developed within the joint J and applied to the workpiece W.

Figure 3:
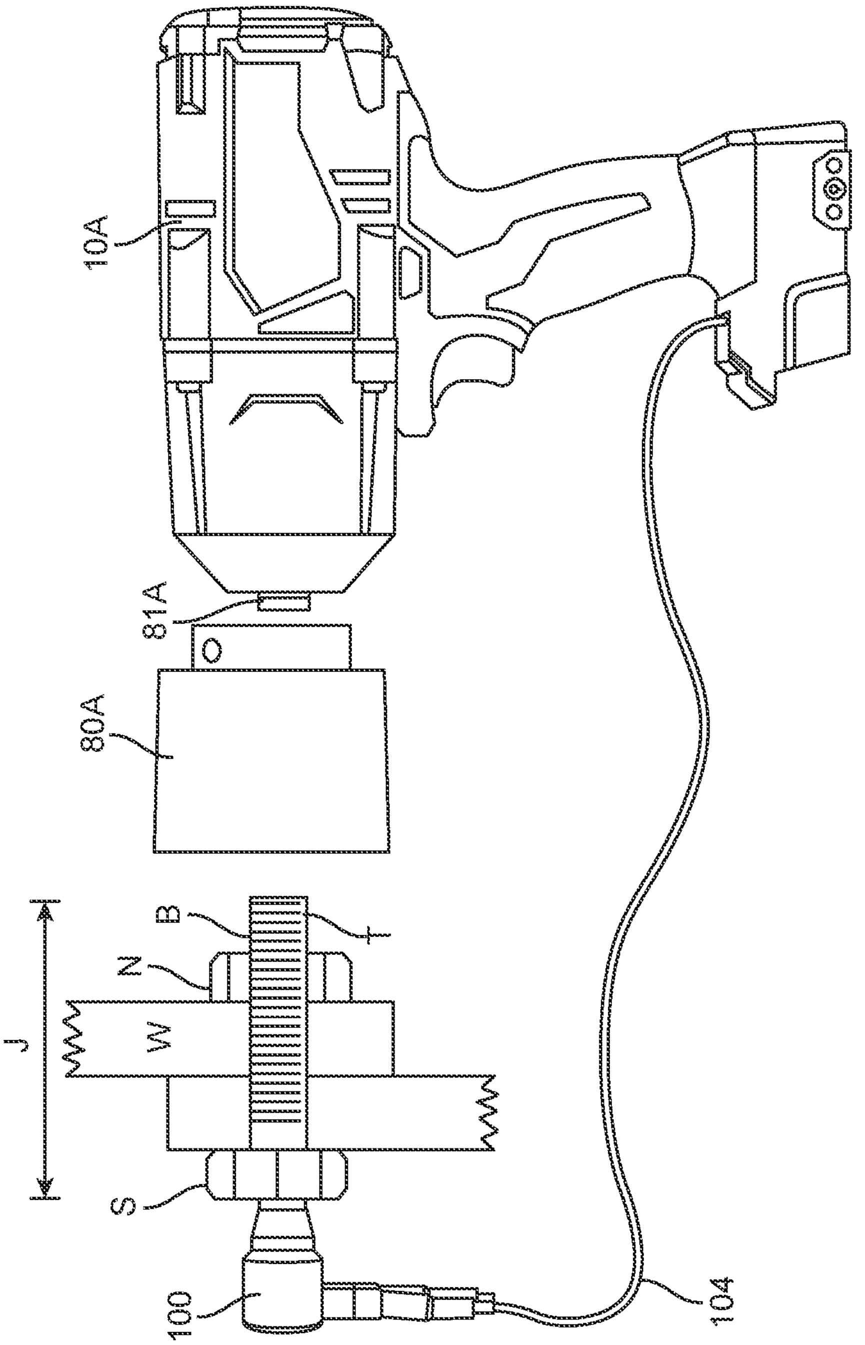
FIG. 3 is a side view of a bolt tensioning tool and a bolt monitoring tool according to another embodiment.

FIG. 3 illustrates a bolt tensioning tool 10A according to another embodiment. The illustrated tool 10A is a rotary impact tool (e.g., an impact wrench), operable to transmit a striking rotational impact to an anvil 81A from the electric motor. The anvil 81A is coupled a tool bit (e.g., a socket) 80A, which engages and rotates the threaded nut N to tension the bolt B and create a fastened joint J. In other embodiments, the bolt tensioning tool 10A may be an oil pulse impact tool, a direct-drive rotary power tool, or any other type of tool suitable for applying torque to the threaded nut N to tension the bolt B.

With reference to FIGS. 1 and 3, in some embodiments, the tool 10, 10A includes a sensor system 100, or a bolt tension monitoring system, which determines whether the bolt B has been stretched to a desired tension. Specifically, the sensor system 100 measures a tension or clamping force acting on the bolt B during tensioning of the bolt B. In other words, the sensor system 100 measures the tension force acting on the bolt B throughout use of the tool 10, 10A. In some embodiments, the sensor system 100 is coupled to the tool 10, 10A (or more specifically, to a controller (not shown) of the tool 10, 10A, which may include a microprocessor, non-transitory memory, and an input/output interface to receive signals from the sensor system 100) via a wire tether 104. The wire tether 104 provides information obtained from the sensor system 100 to the tool 10, 10A. The wire tether 104 extends outside of the housing 14.

Figure 4:
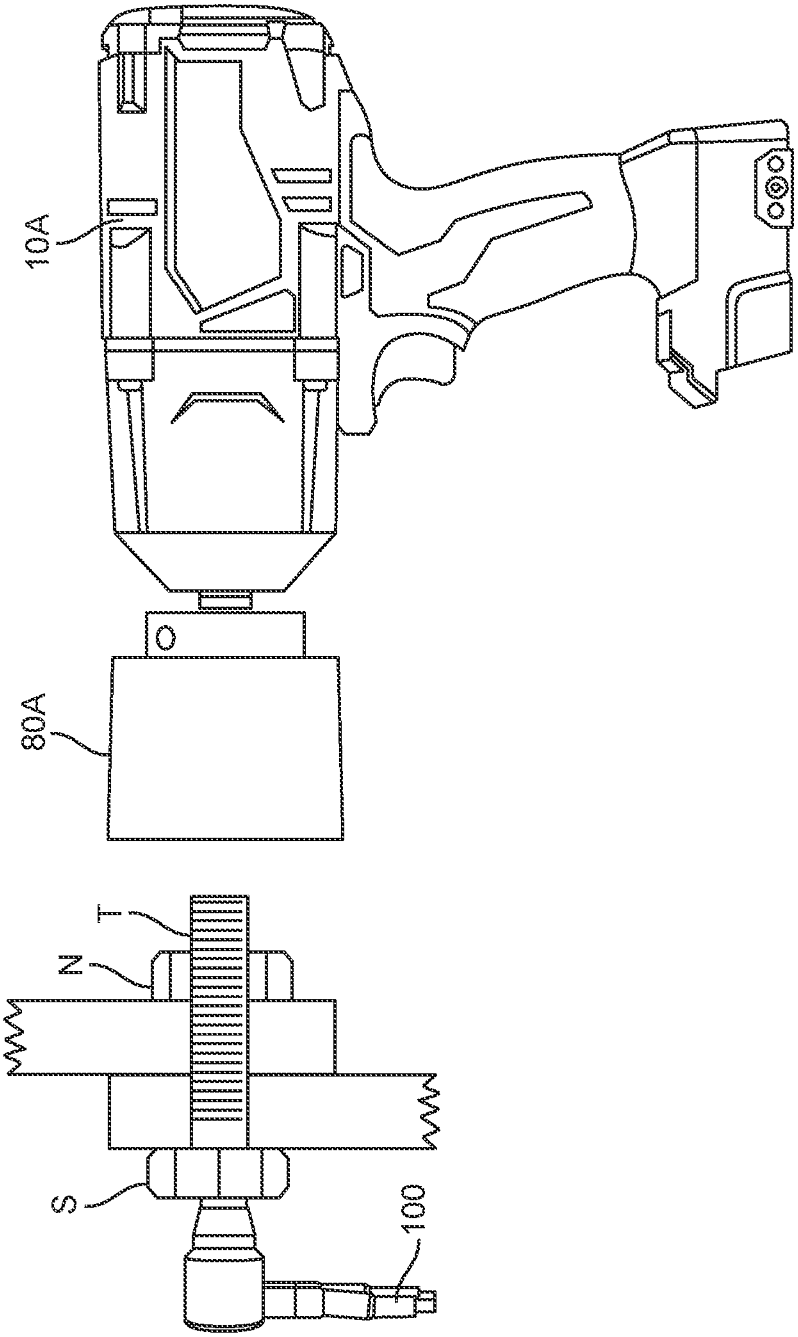
FIG. 4 is a side view of the bolt tensioning tool of FIG. 3 and a bolt monitoring tool according to another embodiment.

In other embodiments, the sensor system 100 may be coupled to the tool 10, 10A via a BLUETOOTH connection or other suitable wireless connection. For example, the sensor system 100 may be separate from the tool 10, 10A, as shown in FIG. 4. The information acquired by the sensor system 100 may thus be transmitted to the tool 10, 10A via the wireless connection. In other embodiments, the sensor system 100 may be disposed within the tool 10, 10A. For example, the sensor system 100 may be included within the collar 78, the mount 70, the anvil 81A, the tool bit 80A, or the like.

Figure 5:
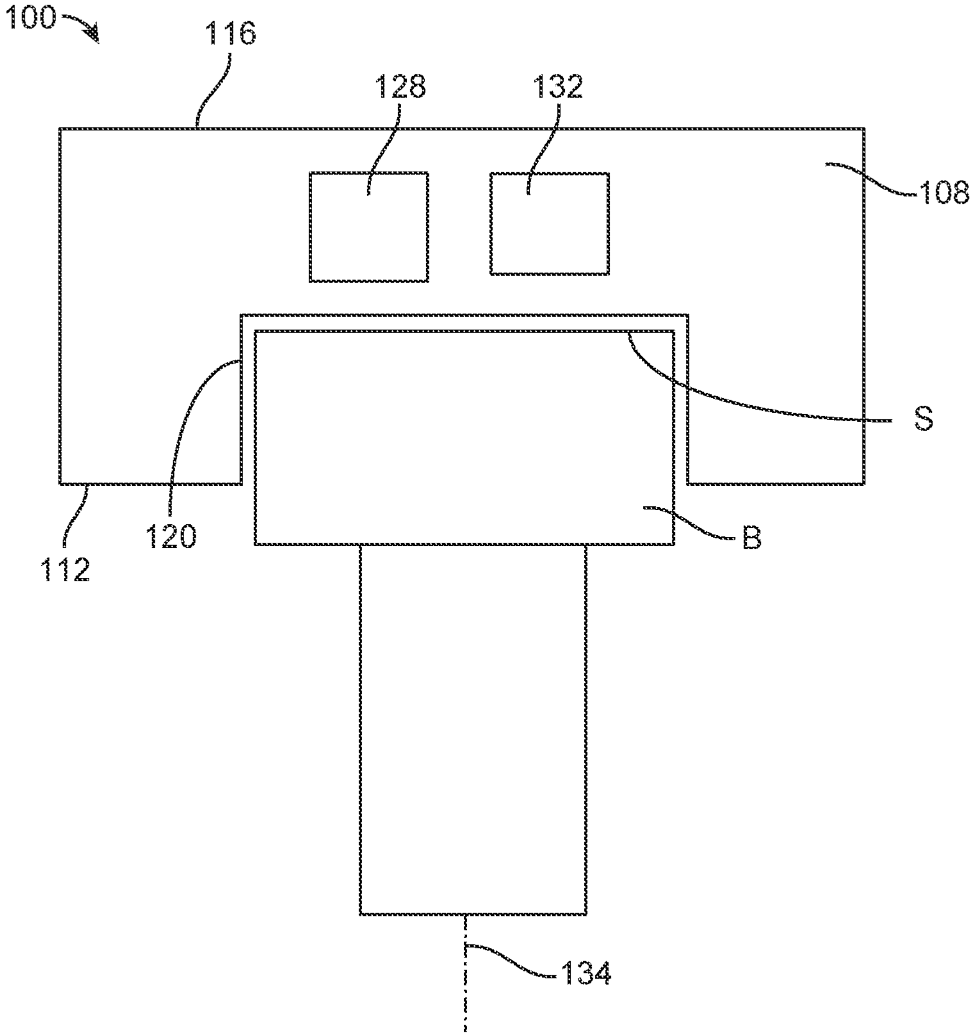
FIG. 5 is a schematic side view of the bolt monitoring tool of FIG. 3, according to one embodiment of the disclosure.

With reference to FIG. 5, the sensor system 100 includes a sensor housing 108 having an inner wall 112 and an outer wall 116. The inner wall 112 defines a recess 120 sized to receive the surface S of the bolt B. The recess 120 may be sized to form a snap fit or pressure fit connection with the bolt B. With reference to FIGS. 3 and 4, in other embodiments, the sensor housing 108 may not include the recess 120. In these embodiments, the user may place the inner wall 112 on a surface S of the bolt B. In some embodiments, the sensor housing 108 may include one or more magnets to magnetically couple the sensor housing 108 to the bolt B.

The illustrated sensor system 100 further includes a transmitter configured to transmit a signal and a receiver configured to receive a signal. The transmitter may be in the form of an ultrasonic transducer 128 and a receiver may be in the form of an ultrasonic sensor 132. The ultrasonic transducer 128 and ultrasonic sensor 132 are disposed within the sensor housing 108. The ultrasonic transducer 128 converts electrical current into sound waves (e.g., at a frequency above 18 kHz). The ultrasonic transducer 128 then transmits the sound waves (e.g., the signal) through the bolt B. The ultrasonic sensor 132 measures an echo (i.e., the return of the sound waves) and converts the echo to a sensor signal (e.g., a voltage/current). The sensor signal is then received and processed by the controller of the tool 10, 10A.

In some embodiments, the controller may determine a dimension of the bolt B from the sensor signal, and then determine a change in the dimension compared to a starting value of the dimension or a previously measured value of the dimension. The change in the dimension may then be correlated with an amount of tension applied to the bolt B, such that the controller may determine the tension on the bolt B based on sensor signal. For example, in some embodiments, the controller may determine the axial length of the bolt B from the sensor signal. The axial length of the bolt B will increase as tension is applied to the bolt B. In other embodiments, the controller may determine the diameter of the bolt B from the sensor signal. The diameter of the bolt B will decrease as tension is applied to the bolt B. Thus, the measured dimension of the bolt B may be correlated with the tension in the bolt B.

In some embodiments, the controller may compare the sensor signal to a predetermined value or target value, corresponding with a desired tension setting. When the value of the sensor signal reaches or exceeds the predetermined value, the tool 10, 10A executes an action. For example, when the predetermined tension value is reached, the tool 10, 10A may turn off. In other embodiments, when the predetermined tension value is reached, the tool 10 may slow down. When performing a tension reading of the bolt B, there may be a gap between the inner wall 112 of the sensor housing 108 and the surface S of the bolt B. In other embodiments, when performing the tension reading of the bolt B, the inner wall 112 of the sensor housing 108 may be in contact with the surface S of the bolt B.

Figure 6:
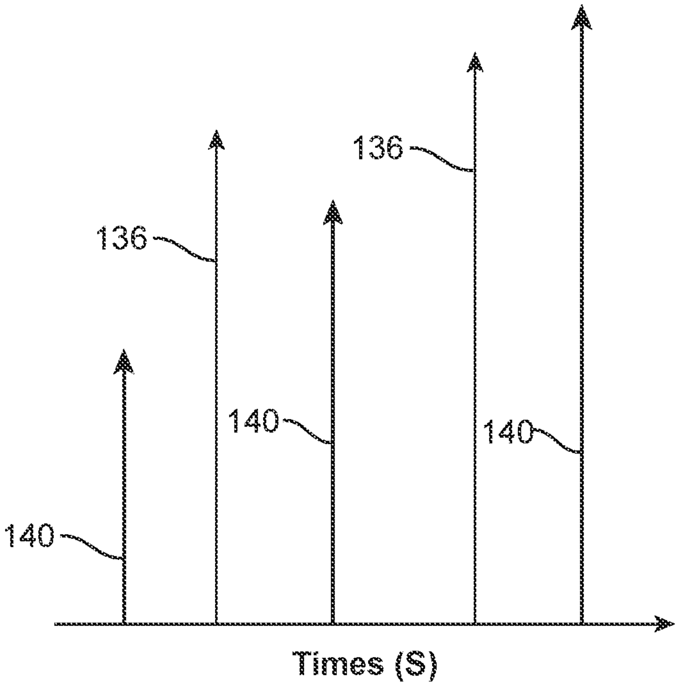
FIG. 6 is a schematic of a graph illustrating an ultrasonic pulse of the bolt monitoring tool of FIG. 5.

With reference to FIG. 6, in embodiments of the tool 10A of FIGS. 3-4 in which the tool 10A outputs rotational impacts to the anvil 81A via the motor, the ultrasonic transducer 128 may produce periodic sound waves during operation of the tool 10A. Specifically, the ultrasonic transducer 128 produces an ultrasonic pulse 136 shortly after an impact event 140 of the tool 10A. For example, each time the bolt B is tightened by the tool 10, the ultrasonic transducer 128 produces the ultrasonic pulse 136. By timing the ultrasonic pulses 136 between impact events 140, interference with the ultrasonic pulse 136 due to the impact event 140 is avoided and a cleaner sensor signal is produced.

In other embodiments, the ultrasonic transducer 128 produces a continuous sound wave such that the ultrasonic sensor 132 provides a continuous reading of the bolt B during the tensioning operation. In some embodiments, the ultrasonic transducer 128 may produce a calibration pulse. The calibration pulse is used to compare subsequent measurements thereto. For example, the predetermined value may be based on the difference between the calibration pulse and subsequent pulses. Once a difference between the calibration pulse and the subsequent pulse is reached, the tool 10, 10A performs the specified action.

In some embodiments, the ultrasonic transducer 128 may be positioned in different locations. Specifically, the ultrasonic transducer 128 may be positioned in the nut N such that the ultrasonic pulses 136 are sent through the surface S of the bolt B, rather than the center 134 (FIG. 5) of the bolt B. In this embodiment, the ultrasonic sensor 132 may still be disposed in the sensor housing 108. In other embodiments, the ultrasonic transducer 128 may be positioned at alternative locations.

In some embodiments, the sensor system 100 may additionally include a centering device (not shown) to align the ultrasonic transducer 128 and/or the ultrasonic sensor 132 with the center 134 of the bolt B. The centering device may be a magnet, a marker that allows the user to see a center of the inner wall 112 to facilitate manually centering the sensor system 100, a sensor that senses if the sensor housing 108 is centered with the bolt B, or a similar device. The recess 120 may additionally act as the centering device.

In some embodiments, the sensor system 100 may be powered by the battery pack 38. In other embodiments, the sensor system 100 may be powered by a piezo device located in the anvil 81B. The piezo device includes a capacitor that is charged throughout the tensioning operation. The capacitor may be used to power the sensor system 100, or an alternative component on the tool 10. In other embodiments, the sensor system 100 may be powered by an alternative power source, such as a dedicated battery.

In use, the user moves the sensor system 100 such that the inner wall 112 of the sensor housing 108 is in contact with the surface S of the bolt B. Once the tensioning operation begins, the ultrasonic transducer 128 transmits a signal throughout the tensioning operation. For example, the ultrasonic transducer 128 may transmit the signal each time the impact event 140 occurs, as explained above. The ultrasonic sensor 132 receives data based on the interaction between the bolt B and the signal. The ultrasonic sensor 132 compares that data to the predetermined (e.g., stored or user-input) threshold values. Once the data received by the ultrasonic sensor 132 indicates that the threshold value(s) are reached, the controller may cease the tensioning operation.

Figure 7:
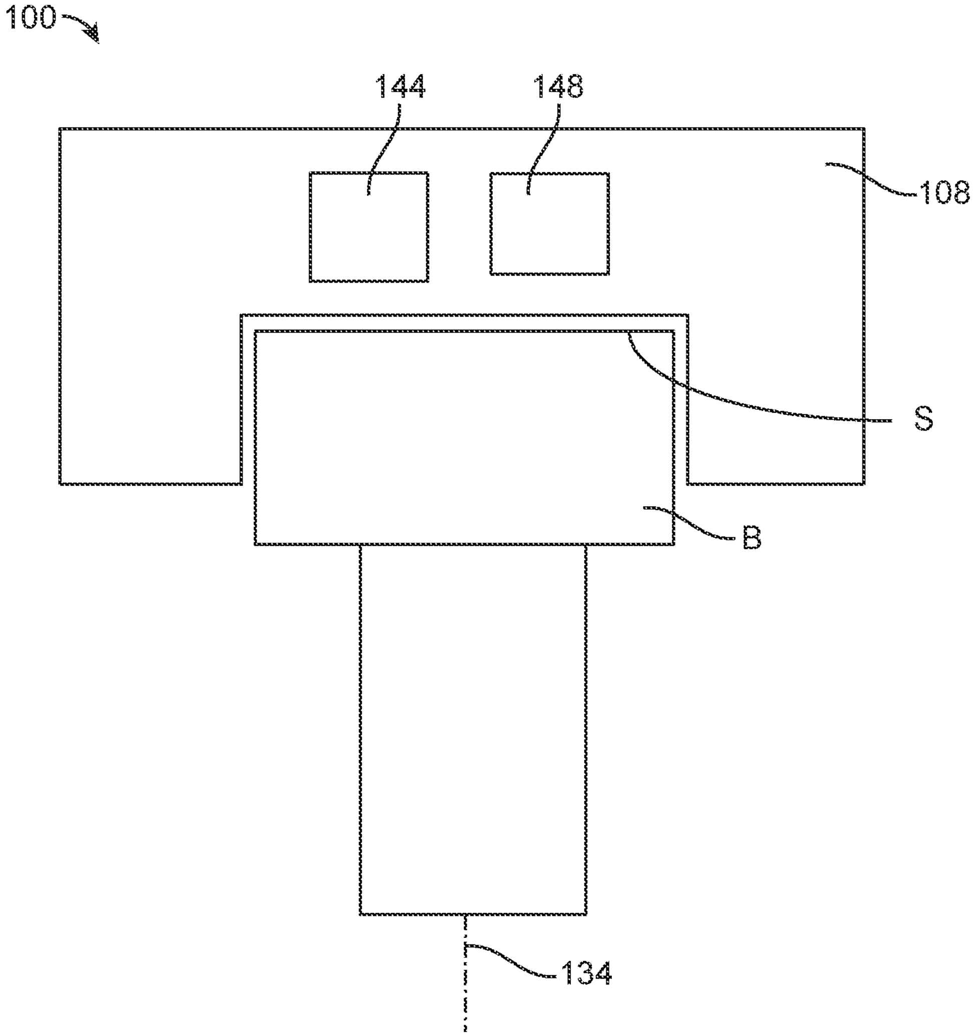
FIG. 7 is a schematic side view of the bolt monitoring tool of FIG. 3, according to another embodiment of the disclosure.

With reference to FIG. 7, in some embodiments, the sensor assembly 100 may include a laser 144 in place of the ultrasonic transducer 128 and an optical sensor or laser sensor 148 in place of the ultrasonic sensor 132. In such embodiments, the laser 144 may be directed to the center 134 of the bolt B. In other embodiments, the laser 144 may be directed to alternative locations on the bolt B. The laser sensor 148 may optionally include a laser profiler configured to receive and interpret a laser line rather than a single laser point. Alternatively, the laser sensor 148 may solely collect data from a single laser point.

In some embodiments the laser 144 may be disposed in different locations. For example, the laser 144 may be positioned at the first end of the tool 10, 10A. In this embodiment, the interior components (e.g., the shaft 46, a cam, the collar 78, anvil 81A, or the like) of the tool 10, 10A may be hollow, such that the laser 144 may travel through the interior components. The laser sensor 148 may be positioned on the sensor housing 108 of the sensor system 100. In other embodiments, the laser 144 may be disposed in alternative locations.

Figure 8:
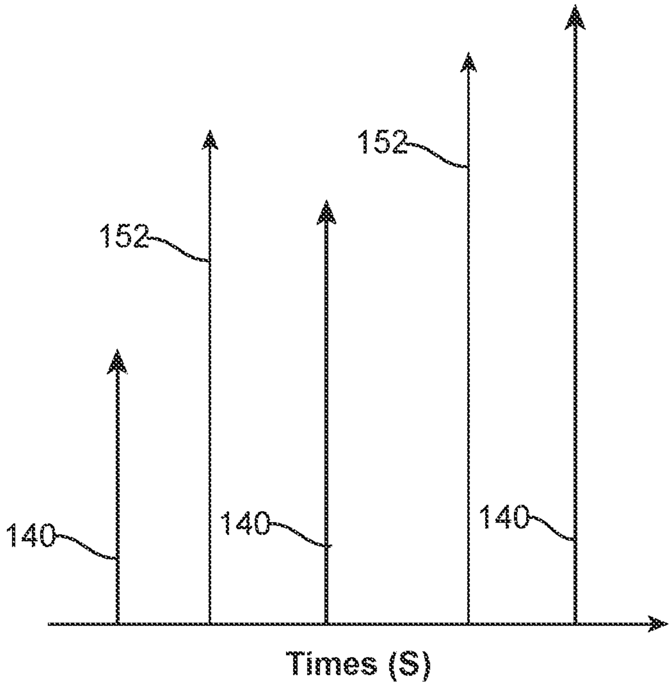
FIG. 8 is a schematic of a graph illustrating an ultrasonic pulse of the bolt monitoring tool of FIG. 7.

The laser sensor 148 and the laser 144 are operable to measure a concavity of the surface S of the bolt B. The laser 144 emits light during operation of the tool 10, 10A. Specifically, the laser 144 may produce laser bursts 152 shortly after the impact event 140 of the tool 10, as shown in FIG. 8. In other embodiments, the laser 144 may produce laser bursts 152 periodically during the tensioning operation. In other embodiments, the laser 144 may produce a continuous laser such that the laser sensor 148 may provide a continuous reading of the bolt B during the tensioning operation. As the tension force acting on the bolt B increases, so does the concavity of the surface S. Once the concavity of the surface S of the bolt B reaches a predetermined threshold value, the tool 10, 10A performs the specified action (e.g., turns off) in the manner explained above.

Figure 9:
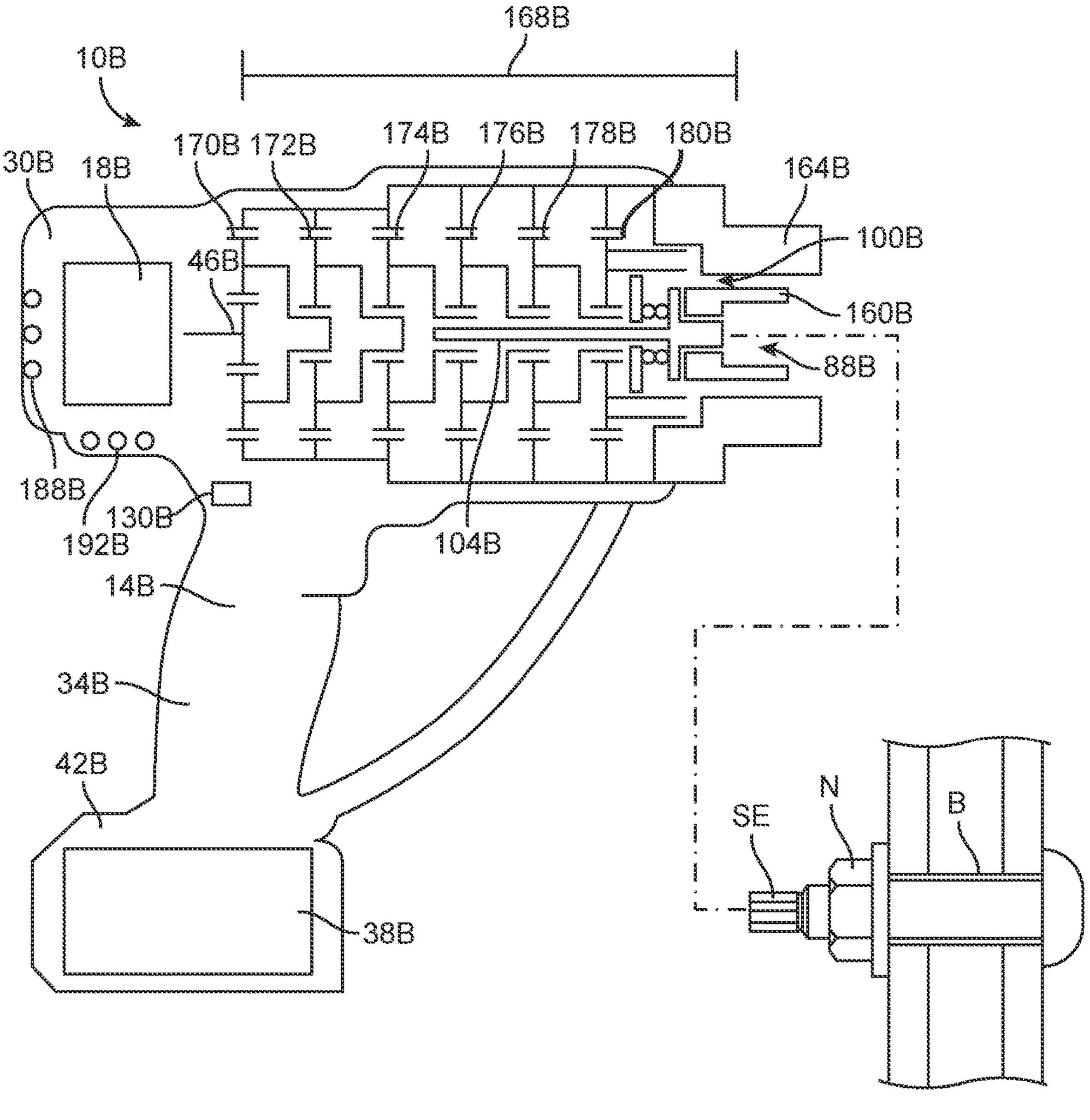
FIG. 9 is a schematic side view of a bolt tensioning tool, according to another embodiment of the disclosure.
Figure 10:
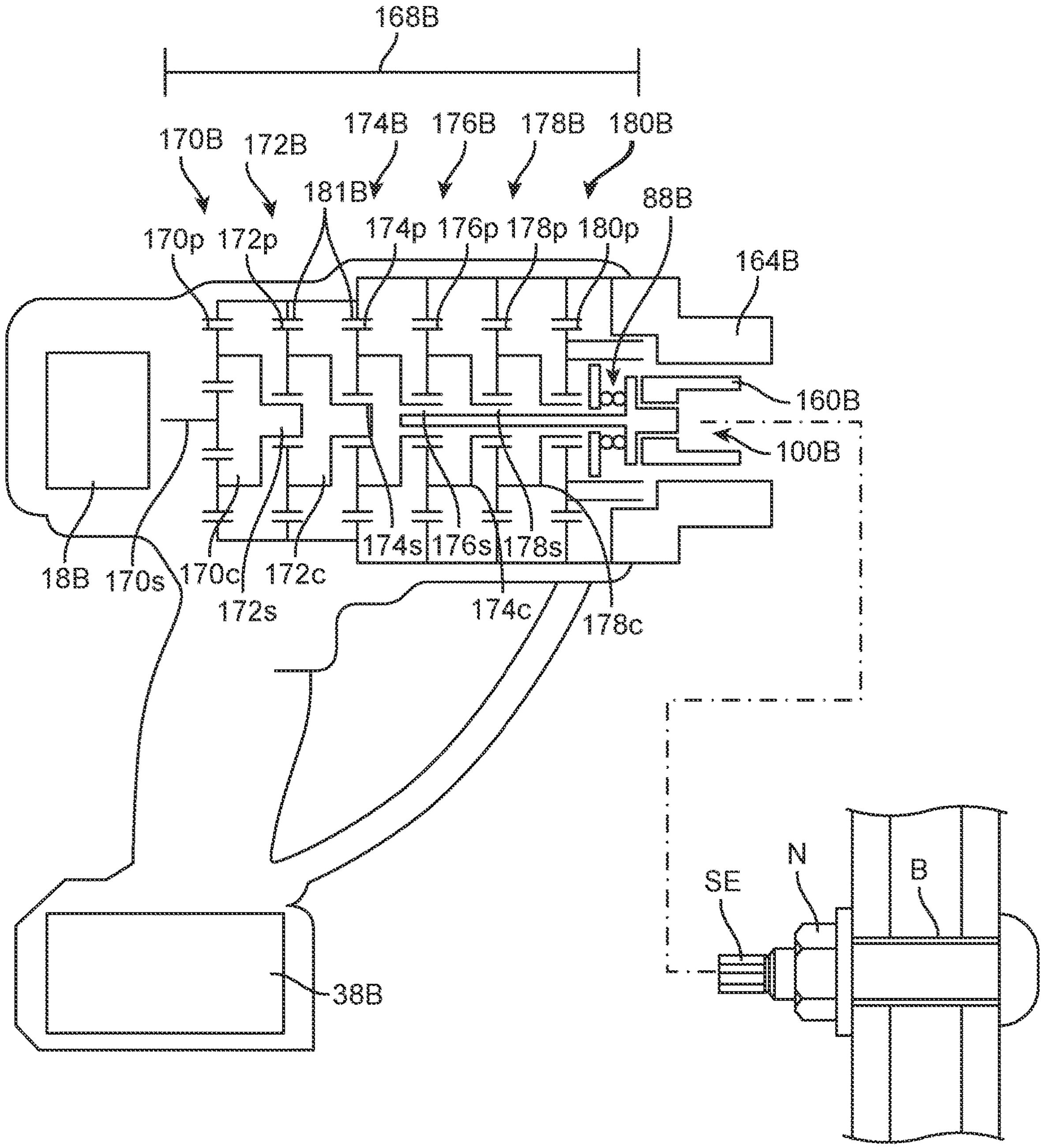
FIG. 10 is a schematic side view of the bolt tensioning tool of FIG. 9.
Figure 11:
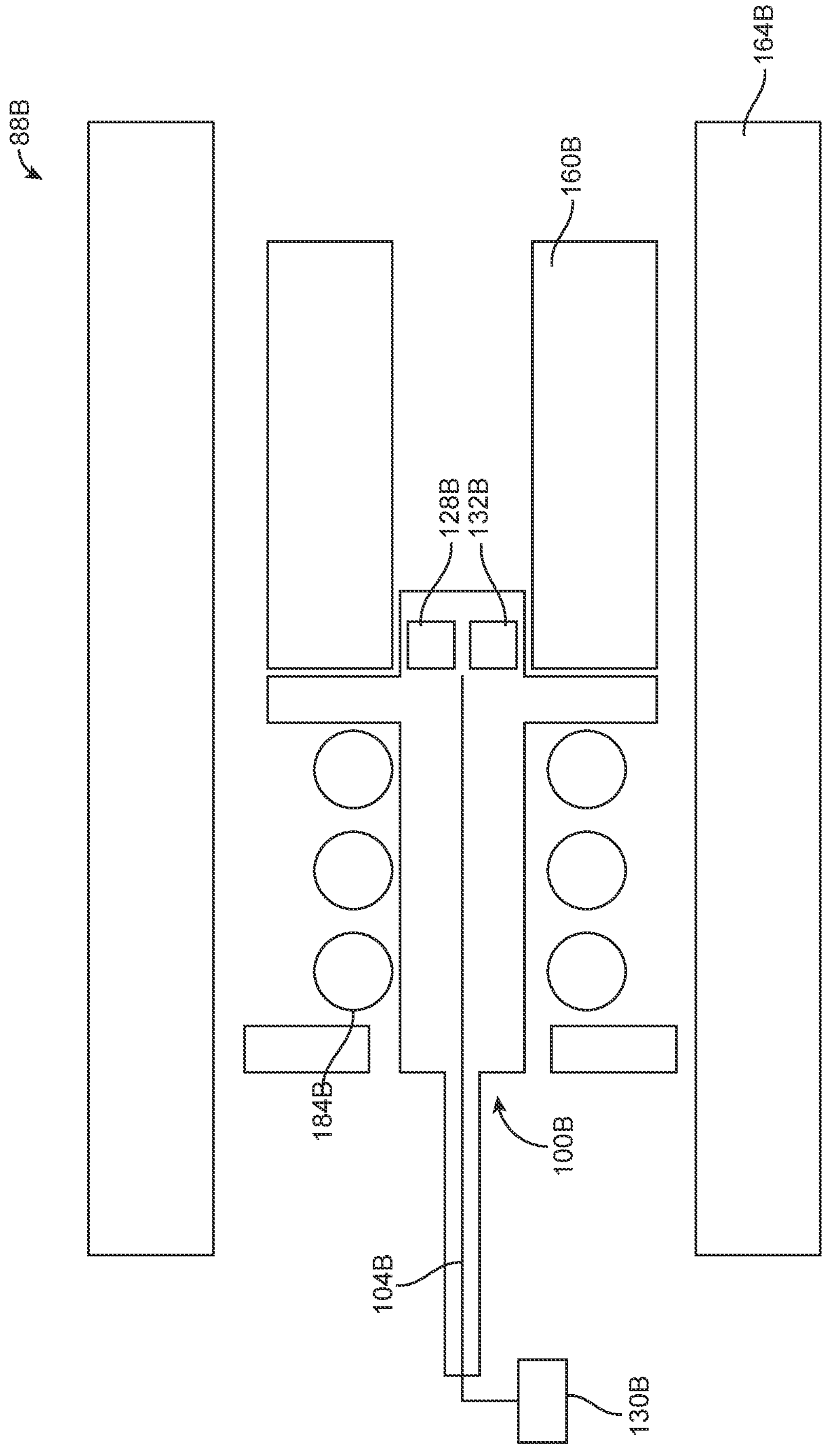
FIG. 11 is a schematic side view of the tensioning assembly of the bolt tensioning tool of FIG. 9.

FIGS. 9-11 illustrate a bolt tensioning tool 10B according to another embodiment. The illustrated tool 10B is a rotary power tool (e.g., a tension control shear wrench), operable to fasten a nut N onto a bolt B by applying torque to the nut N and the bolt B. The illustrated bolt B is a tension control ("TC") bolt, such as a TNA® bolt or a TN-144 bolt, which includes a splined end SE (FIG. 9).

The illustrated bolt tensioning tool 10B includes a housing 14B, an electric motor 18B positioned within the housing 14B, a tensioning assembly 88B, a transmission in the form of a multi-stage planetary gear assembly 168B positioned within the housing 14B, and a sensor system 100B positioned within the housing 14B. In the illustrated embodiment of the tool 10B, the housing 14B includes a motor housing portion 30B, in which the motor 18B is positioned, and a handle portion 34B oriented perpendicular to the motor housing portion 30B (e.g., in a direction perpendicular with a drive axis of the motor 18B in some embodiments). The handle portion 34B may be grasped by a user when the tool 10B is in use.

The tool 10B includes a battery pack 38B removably coupled to a battery receptacle 42B located at the bottom of the handle portion 34B. The electric motor 18B receives power from the battery pack 38B via the battery receptacle 42B when the battery pack 38B is coupled to the battery receptacle 42B. In the illustrated embodiment, the motor 18B is a brushless direct current ("BLDC") motor with a stator and a rotor (not shown) having a motor output shaft 46B that is rotatable about an axis relative to the stator. In other embodiments, other types of motors may be used.

With continued reference to FIG. 9, the tensioning assembly 88B is configured to tighten the nut N onto the bolt B while holding the bolt B stationary. The illustrated tensioning assembly 88B includes an inner socket 160B and an outer socket 164B. The inner socket 160B includes a spline pattern configured to receive the splined end SE of the bolt B. The outer socket 164B is configured to receive the nut N. The inner socket 160B may remain stationary during operation of the bolt tensioning tool 10B to fix the bolt B in place while the outer socket 164B rotates to advance and tighten the nut N. In the illustrated embodiment, the tensioning assembly 88B is positioned opposite the motor 18B. The tensioning assembly 88B is also coaxial with the drive axis of the motor 18B. Alternatively, the tensioning assembly 88B may be offset from the drive axis of the motor 18B.

As shown in FIG. 10, the planetary gear assembly 168B is configured to increase the torque and transfer the torque from the motor 18B to the tensioning assembly 88B. The planetary gear assembly 168B of the illustrated tool 10B has six planetary gear stages 170B, 172B, 174B, 176B, 178B, 180B; however, additional, or fewer stages may be used. The planetary gear assembly 168B also includes a ring gear 181B fixed within the housing 14B and surrounding each of the six planetary gear stages 170B, 172B, 174B, 176B, 178B, 180B. In other embodiments, the ring gear 181B may be one of a plurality of ring gears.

The output shaft 46B of the motor 18B includes or is connected to a sun gear **170*s* of the first planetary stage 170B. The sun gear 170*s* transfers torque from the output shaft 46B to a plurality of planet gears 170*p* of the first planetary stage 170B. The planet gears 170*p* are supported by a first planetary carrier 170*c* and meshed with the ring gear 181B, such that the sun gear 170*s* drives the planet gears 170*p*, which in turn advance along an inner periphery of the ring gear 181B. This causes the first planetary carrier 170*c* to rotate at a reduced speed and increased torque relative to the sun gear 170*s***.

The first plant carrier **170*c* has an output shaft that includes a second sun gear 172*s*. The second sun gear 172*s*** transfers the torque from the first planetary stage 170B to a second planetary carrier 172*c* by way of a second plurality of planet gears 172*p*. The second plurality of planet gears 172*p* is supported by the second planetary carrier 172*c* and meshed with the ring gear 181B, such that the second sun gear 172*s* drives the planet gears 172*p*, which in turn advance along the inner periphery of the ring gear 181B. This causes the second planetary carrier 172*c* to rotate at a reduced speed and increased torque relative to the first planetary carrier 170*c* and second sun gear 172*s*.

The third, fourth, fifth, and sixth planetary gear stages 174B, 176B, 178B, 180B operate in the same way to provide additional speed reductions and torque increases. The sixth plurality of planet gears 180*p* of the sixth planetary gear stage 180 are supported by the outer socket 164B, such that the outer socket 164B serves as the last stage planetary carrier of the planetary gear assembly 168B. Thus, as the sixth plurality of planet gears 180*p* advance along the inner periphery of the ring gear 181B, the outer socket 164B rotates. In this way, the planetary gear assembly 168B transmits torque from the motor 18B to the outer socket 164B.

With reference to FIG. 11, the sensor system 100B will now be described. The sensor system 100B may be similar to embodiments of the sensor system 100 described above with reference to FIGS. 1-8, and features and control methods of the sensor system 100B may be incorporated into the sensor system 100 and vice versa.

The sensor system 100B is operable to determine whether the nut N has been tightened to a sufficient degree to apply a desired tension to the bolt B. The sensor system 100B includes a transmitter in the form of an ultrasonic transducer 128B, and a receiver in the form of an ultrasonic sensor 132B, and a controller 130B, which communicates with the ultrasonic transducer 128B and the ultrasonic sensor 132B via wiring 104B.

The ultrasonic transducer 128B and the ultrasonic sensor 132B are disposed in the inner socket 160B such that the ultrasonic transducer 128B and the ultrasonic sensor 132B is adjacent to the splined end SE of the bolt B when the bolt B is inserted in the inner socket 160B. Specifically, the ultrasonic sensor 132B contacts the bolt B when the splined end SE of the bolt B is inserted into the inner socket 160B (FIG. 9). In some embodiments, the sensor system 100B may include a biasing member 184B (e.g., a spring) configured to bias the ultrasonic transducer 128B and the ultrasonic sensor 132B towards the bolt B to ensure the ultrasonic transducer 128B and the ultrasonic sensor 132B stay in contact with the bolt B during the tensioning operation, and to provide flexibility for bolts having different lengths.

The ultrasonic transducer 128B converts electrical current into sound waves and transmits the sound waves through the bolt B. The ultrasonic transducer 128B can transmit the sound waves periodically, continuously, or in calibrated pulses. The ultrasonic sensor 132B measures the echo of the sound waves though the bolt and converts the echo to a sensor signal such as a voltage. The ultrasonic sensor 132B sends the sensor signal to the controller 130.

The sensor signal can be transferred from the ultrasonic sensor 132B to the controller 130 through a wired connection (via wiring 104B). In some embodiments, the wiring 104B may extend at least partially through a channel in the planetary gear assembly 168B. In other embodiments, the wiring 104B may be routed elsewhere through the housing 14B. In yet other embodiments, the ultrasonic sensor 132B and transducer 128B may communicate with the controller 130B wirelessly.

The controller 130B can determine the tension of the bolt B from the sensor signals, which may correspond to the axial length of the bolt B. The length of the bolt B increases as tension is applied to the bolt B. The controller 130 may determine the bolt B has been correctly tensioned or that a desired tension has been met once the bolt B reaches a predetermined length. The predetermined length may be a set value that corresponds with construction standards. Alternatively, the controller 130B can measure the diameter of the bolt B from the sensor signals to determine if the desired tension has been met. Once the controller 130B has determined that the desired tension has been met, the tool 10B may turn off (i.e., the motor 18B may be de-energized). Alternatively, the tool 10B may slow down and notify a user that the desired tension has been met.

The tool 10B may also include a user interface 188B and an LED readout 192B. The user interface 188B may be disposed on the housing 14B on the end opposite of the tensioning assembly 88B and above the handle portion 34B. The user interface 188B may allow a user to preset the desired tension to be applied to a bolt and display the tension in real time during the tensioning operation. The user interface 188B may also include information related to the amount of charge in the battery pack 38B.

The LED readout 192B may be disposed on the side of the housing 14B adjacent to the handle portion 34B. The LED readout 192B may be comprised of a plurality of LED light patterns that indicate the tension levels of the bolt B. For example, the LED readout 192 may only have one light lit if the bolt B is not tensioned. Alternatively, the LED readout 192 may have all the lights lit if the bolt B is fully tensioned. Additionally, the LED readout 192 may use colored lights to display the status of the bolt B. The LED readout 192 allow the user to easily determine if the bolt B has been successfully tensioned.

The sensor system 100B of the tool 10B allows the tool 10B to repeatably tighten TC bolts B to a specified torque value, without requiring a torque transducer or angle sensor. In addition, the tool 10B can be used with TC bolts B without a control groove that causes the splined end SE of the bolt B to shear off when the specified torque value is reached. This allows the tool 10B to be used with a greater variety of TC bolts. Furthermore, by not shearing off the splined end SE of the bolt B, the tool 10B need not have an ejector mechanism, and the operator does not need to collect and dispose of sheared-off portions of the bolt B.

Various features of the disclosure are set forth in the following claims.

What is claimed is:

1. A bolt tensioning tool comprising:

a housing;

an electric motor positioned within the housing;

a tensioning assembly connectable to a bolt for applying tension thereto, the bolt having a threaded portion and a surface; and a bolt tension monitoring system including a transmitter configured to transmit a signal, a receiver configured to receive the signal, a sensor housing, and a controller, the sensor housing having an inner wall defining a recess configured to receive the surface of the bolt, the controller configured to determine a dimension of the bolt during a tensioning operation and to determine the tension in the bolt based on the dimension, wherein the tensioning assembly applies tension to the bolt during the tensioning operation, wherein the tensioning operation includes a plurality of impact events, wherein the transmitter is configured to transmit the signal between impact events.

2. The bolt tensioning tool of claim 1, wherein the transmitter includes an ultrasonic transducer, and the receiver includes an ultrasonic sensor, the ultrasonic transducer configured to produce sound waves as the signal.

3. The bolt tensioning tool of claim 1, wherein the transmitter includes a laser, and the receiver includes a laser sensor, the laser configured to emit a light as the signal.

4. The bolt tensioning tool of claim 1, wherein the transmitter is configured to continuously transmit the signal during the tensioning operation.

5. The bolt tensioning tool of claim 1, wherein the bolt tension monitoring system is attached to the bolt tensioning tool by a wire tether.

6. The bolt tensioning tool of claim 1, wherein the tensioning assembly includes an anvil, the anvil configured to transmit rotational impacts from the electric motor to a threaded nut to tension the bolt.

7. The bolt tensioning tool of claim 1, wherein the tensioning assembly includes a pump configured to drive a piston and collar configured to receive the threaded portion of the bolt, the piston configured to apply a tensile force to the threaded portion of the bolt.

8. A bolt tensioning tool comprising:

a housing;

an electric motor positioned within the housing;

a tensioning assembly having an inner socket and an outer socket, the inner socket connectable to a bolt, the outer socket connectable to a nut, wherein the outer socket is configured to rotate the nut relative to the bolt to apply tension to the bolt during a tensioning operation;

a bolt tension monitoring system positioned within the housing, the bolt tension monitoring system including an ultrasonic transducer and an ultrasonic sensor; and a planetary gear system configured to transfer torque from the electric motor to the outer socket, the planetary gear system including a plurality of stages, each stage including a carrier gear and a plurality of gears supported by the carrier gear, wherein the bolt tension monitoring system is configured to monitor the tension of the bolt during the tensioning operation, wherein the outer socket defines the carrier gear of a last planetary gear stage of the plurality of stages.

9. The bolt tensioning tool of claim 8, wherein the planetary gear system includes six stages.

10. The bolt tensioning tool of claim 8, further comprising a wire connecting the bolt tension monitoring system to a controller.

11. The bolt tensioning tool of claim 10, wherein the wire extends at least partially through the planetary gear system.

12. The bolt tensioning tool of claim 8, wherein the ultrasonic transducer and the ultrasonic sensor are disposed on the inner socket.

13. The bolt tensioning tool of claim 8, wherein the ultrasonic sensor is adjacent to an end of the bolt when the bolt is inserted in the inner socket.

14. The bolt tensioning tool of claim 8, further comprising a biasing member configured to bias the ultrasonic transducer and the ultrasonic sensor toward an end of the bolt when the bolt is inserted in the inner socket.

15. The bolt tensioning tool of claim 8, further comprising a LED readout disposed on the housing.

16. The bolt tensioning tool of claim 15, wherein an LED pattern of the LED readout corresponds to a measured tension of the bolt.

17. A bolt tensioning tool comprising:

a housing;

an electric motor positioned within the housing;

a tensioning assembly having an inner socket and an outer socket, the inner socket connectable to a bolt, the outer socket connectable to a nut, wherein the outer socket is configured to rotate the nut relative to the bolt to apply tension to the bolt during a tensioning operation;

a planetary gear system configured to transfer torque from the electric motor to the outer socket, the planetary gear system including a plurality of stages, each stage including a carrier gear and a plurality of gears supported by the carrier gear;

a bolt tension monitoring system configured to monitor the tension of the bolt during the tensioning operation, the bolt tension monitoring system including a controller and a sensor; and a biasing member configured to bias the sensor toward an end of the bolt when the bolt is inserted in the inner socket, wherein the controller is configured to determine the tension of the bolt based on a signal from the sensor corresponding with a dimension of the bolt, wherein the outer socket defines the carrier gear of a last planetary gear stage of the plurality of stages.

* * * * *